United States Patent [19]

Cater

[11] 3,811,265

[45] May 21, 1974

[54] CODED TIME INDICATING TRANSMISSION SYSTEM

[76] Inventor: John P. Cater, 3519 Fallen Leaf Ln., San Antonio, Tex. 78230

[22] Filed: Jan. 17, 1973

[21] Appl. No.: 324,397

[52] U.S. Cl. .................................... 58/24 R, 58/25

[51] Int. Cl. ............................................ G04c 13/02

[58] Field of Search ........................... 58/24–26, 33, 58/34, 35 R; 343/225

[56] References Cited

UNITED STATES PATENTS

| | | | |
|---|---|---|---|
| 3,194,003 | 7/1965 | Polin | 58/23 R X |
| 3,541,552 | 11/1970 | Carlson | 58/24 R X |
| 3,643,420 | 10/1969 | Haydon | 58/24 R |
| 3,681,914 | 4/1970 | Loewengart | 58/24 R |
| 3,685,278 | 8/1972 | Haydon | 58/24 R |

*Primary Examiner*—Stephen J. Tomsky
*Assistant Examiner*—Edith Simmons Jackmon
*Attorney, Agent, or Firm*—Lowe, King & Price

[57] ABSTRACT

Time indicating signals are transmitted from a master clock at a central station to a slave clock at a peripheral station via a two-wire line as binary values represented by pulsed duration modulated signals. Clock, coding and transmitting circuitry at the central station are normally energized by an a.c. power line source. In the event of failure of the a.c. power source, the clock is energized by a battery and transmission from the central station to the remote station ceases. On resumption of power, the first transmission from the central station to the peripheral station enables the slave clock to provide a correct time indication. Transmission can be over any existing lines interconnecting the central and peripheral stations, such as a 60-cycle power line, television cable, or a telephone link. If television cable or 60-cycle line is employed, the presence and absence of voltage is indicated by frequency shift keying transmission. Transmission of the time indication requires only a fraction of the total transmission time, and is constant for all time indications, whereby other data signals can be transmitted between the central and peripheral stations.

19 Claims, 6 Drawing Figures

CODED TIME INDICATING TRANSMISSION SYSTEM

FIELD OF INVENTION

The present invention relates generally to systems for transmitting time indications between central and peripheral stations and, more particularly, to a system wherein binary coded clock indications are transmitted via a two-wire line between the stations.

BACKGROUND OF THE INVENTION

Many systems are in use for transmitting time information from a central station including a master clock to one or more peripheral stations including slave clocks. One type of these systems is generally characterized by transmitting a pulse once each minute from the master clock to the slave clocks. A disadvantage of this type of system is the requirement for manual resetting of the slave clocks when a power failure occurs for the master clock and its associated circuitry. In a large building having many slave clocks, such as a hotel, school or certain office buildings, manual resetting of the slave clocks can be a problem.

In another type of these systems, the time indication at the master clock is transmitted via a multi-lead cable to the slave clocks. One of the leads is assigned to each of the digital values which are represented by the time indication. For a typical clock that displays hours and minutes, such an arrangement requires 27 signal carrying leads between the master and slave clocks, which obviously results in relatively high cost for both initial installation and possibly maintenance.

BRIEF DESCRIPTION OF THE INVENTION

In accordance with the present invention, time indications in binary coded form are transmitted from a master clock at a central station to one or more peripheral stations including decoder circuitry which drives a slave clock. The binary coded time indication at the master clock is constantly updated at a very rapid rate, such as once every second. The master clock is normally powered by an a.c. source but can be powered by a battery for a very long period, such as two weeks, in the event of failure of the a.c. source. In the event of an a.c. power source failure, coding and transmission circuitry at the central station are deactivated so that the clock can run with a minimum of power from the battery. When a.c. power is resumed, the coding and transmitting circuitry at the central station are again activated and the master clock time indication is immediately transmitted to the slave clocks at the peripheral stations, whereby the correct indication is almost immediately automatically provided at the slave clock without manual resetting thereof.

A further feature of the invention is that the time indication can be transmitted from the central to the peripheral station on existing two-wire lines interconnecting the stations. The two-wire line can be a 60-cycle power line or a television cable, as well as a telephone link. For relatively noise-free transmission, the time indication is represented as a binary signal, wherein the two binary values are represented by pulses having differing durations. A synchronizing pulse, having a duration different from those associated with the binary value durations, is inserted between a predetermined number of the data indicating pulses. Between the pulses, which have a finite non-zero voltage level, the time indicating signal has a zero voltage level. The zero and finite voltage levels are transmitted via the 60-cycle power line and the television cable as a pair of constant frequencies having values outside of the 60-cycle and television frequency ranges, whereby interference between the zero and finite level bursts and the power line and television frequencies is precluded.

Regardless of the time indicated by the transmitted coded signal, each time indication requires the same time duration which is a fraction of the total time between adjacent time indicating transmissions. Thereby, it is possible to transmit additional information from a central station to a plurality of peripheral stations via a transmission system utilizing the present invention.

It is, accordingly, an object of the present invention to provide a new and improved system for transmitting time indications from a central station including a master clock to one or more peripheral stations including slave clocks.

A further object of the invention is to provide a system wherein a power failure at a central station including a master clock does not require manual resetting of clocks at peripheral stations after power is restored to the master station.

An additional object of the invention is to provide a new and improved system for transmitting time indications from a master clock at a central station to a slave clock at one or more peripheral stations wherein existing, two-wire lines between the stations can be employed.

Another object of the invention is to provide a new and improved system for transmitting time indications from a central station to one or more peripheral stations utilizing existing two-wire lines without interference from transmissions normally on said lines.

An additional object of the present invention is to provide a new and improved system for transmitting time indications, as well as other signals, between a central station including a master clock and one or more peripheral stations including a slave clock.

The above and still further objects, features and advantages of the present invention wil become apparent upon consideration of the following detailed description of one specific embodiment thereof, especially when taken in conjunction with the accompanying drawing.

DETAILED DESCRIPTION OF THE DRAWING

Figure 1:
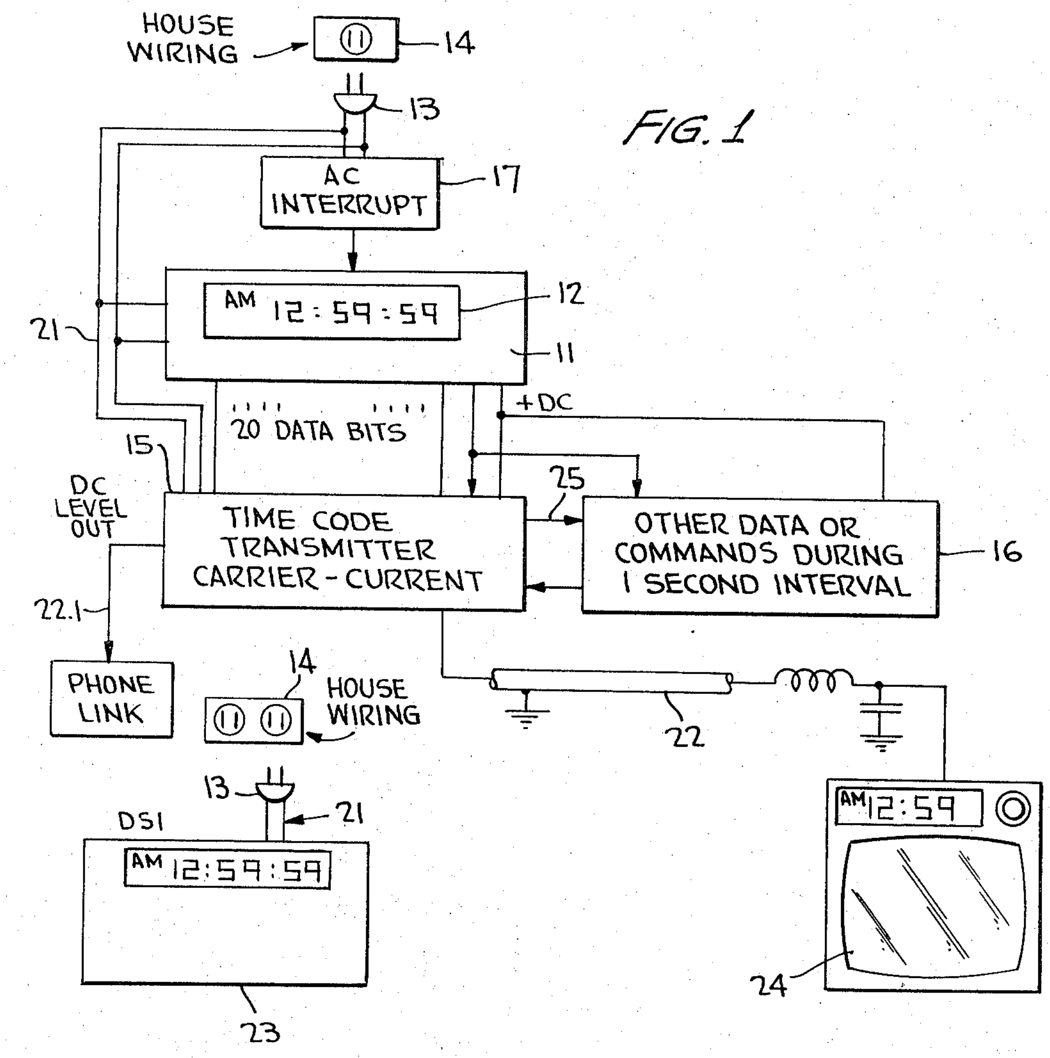
FIG. 1 is a block diagram of an embodiment of the present invention.

Reference is now made to FIG. 1 of the drawing wherein there is illustrated a conventional electronic clock 11, which serves as a master clock, for deriving a 20 bit, parallel, binary output indicative of time in terms of units of seconds (four bits representing 0 to 9), tens of seconds (three bits representing 0 to 5), units of minutes (four bits representing 0 to 9), and tens of hours (one bit representing 0 to 1), as well as a binary indication of a.m. and p.m. The single bit binary indication for a.m. or p.m. can be included in the representation for tens of hours, to enable the tens of hours indication to be from zero to two, if a 24 hour clock, rather than a 12 hour clock is provided. Clock 11 is preferably an integrated circuit, requiring a minimum amount of power, similar to the integrated circuits now being employed for electronic wrist watches. Master clock 11 includes an electronic output display 12, such as provided by liquid crystals or light emitting diodes.

Power for clock 11 is normally supplied by an a.c. 60-cycle source, as is obtained by inserting male plug 13 into a 60-cycle a.c. power outlet 14. The a.c. power supplied to plug 13 is normally fed to master clock 11, where it is converted to a d.c. power supply voltage for circuitry in the master clock, time code transmitter 15 and other digital data sources or command sources 16 at the central station. Also responsive to the a.c. power derived from plug 13 is a.c. interrupt detector 17 which energizes circuitry in clock 11 to enable a battery contained in the clock to be the exclusive source of power for the clock circuitry. Normally, the battery is charged by the d. c. power supply of the clock. The clock circuitry, being fabricated of integrated circuit components, requires a minimum amount of power and can function in response to the battery for a period on the order of two weeks. Thereby, clock 11 constantly provides an accurate indication of time to the nearest second, even though there is a failure of the 60-cycle source at outlet 14 for an appreciable time.

The 20 bit parallel, binary output of master clock 11 is fed to time code transmitter 15 which, once every second, transmits a 20 data bit serial binary coded signal to one or more peripheral stations, each of which includes a slave clock. Binary one and zero data values are represented in each serial signal as different length finite, non-zero voltage pulse durations. After every fourth data pulse, there is inserted a sync pulse of finite voltage for a duration longer than the binary one or zero values. A zero voltage is derived between each of the finite voltages. The zero and finite voltages are transmitted as bursts of different frequencies via 60-cycle two-wire line 21, or on a two-wire television cable 22. In the alternative, the d.c. variable pulse duration levels can be transmitted via a two-wire telephone link 22.1 from transmitter 15 to a remote station. Typically, 60-cycle line 21 is employed in a school, office building, or possibly, home and may be connected to slave clock 23, while the television cable may be used in a hotel, in which case the slave clock is included in television receiver 24. The time indications transmitted between the central and remote stations can be used for activating on and off time responsive signals at the remote location, such as are included in alarm clocks or ovens. A slave clock at a peripheral station responsive to the 20 data bit signal can display time to the nearest second or the nearest minute, as desired. The remote time indication is preferably updated once every second, even though minutes are the lowest unit of time displayed; updating can, however, be less frequent if desired.

To provide 1-second updating, each time indicating signal is transmitted between central station 15 and the peripheral stations once every second in response to each occurrence of a transmit pulse derived by master clock 11 once every second. The transmit pulses initiate transmission of the time indicating signal by transmitter 15, which signal subsists in the particularly disclosed embodiment for a period of 268 milliseconds. Upon termination of the 268 millisecond interval, time code transmitter 15 supplies a control signal to other data or command source 16 via line 25. The signal on line 25 enables the other data or command sources to transmit signals on two-wire lines 21, 22 and 22.1 through transmitter 15, until the next transmit pulse is derived by master clock 11. In response to the next transmit pulse being derived by master clock 11, the other data or command source 16 is deactivated to prevent transmission from source 16 through transmitter 15.

Figure 2:
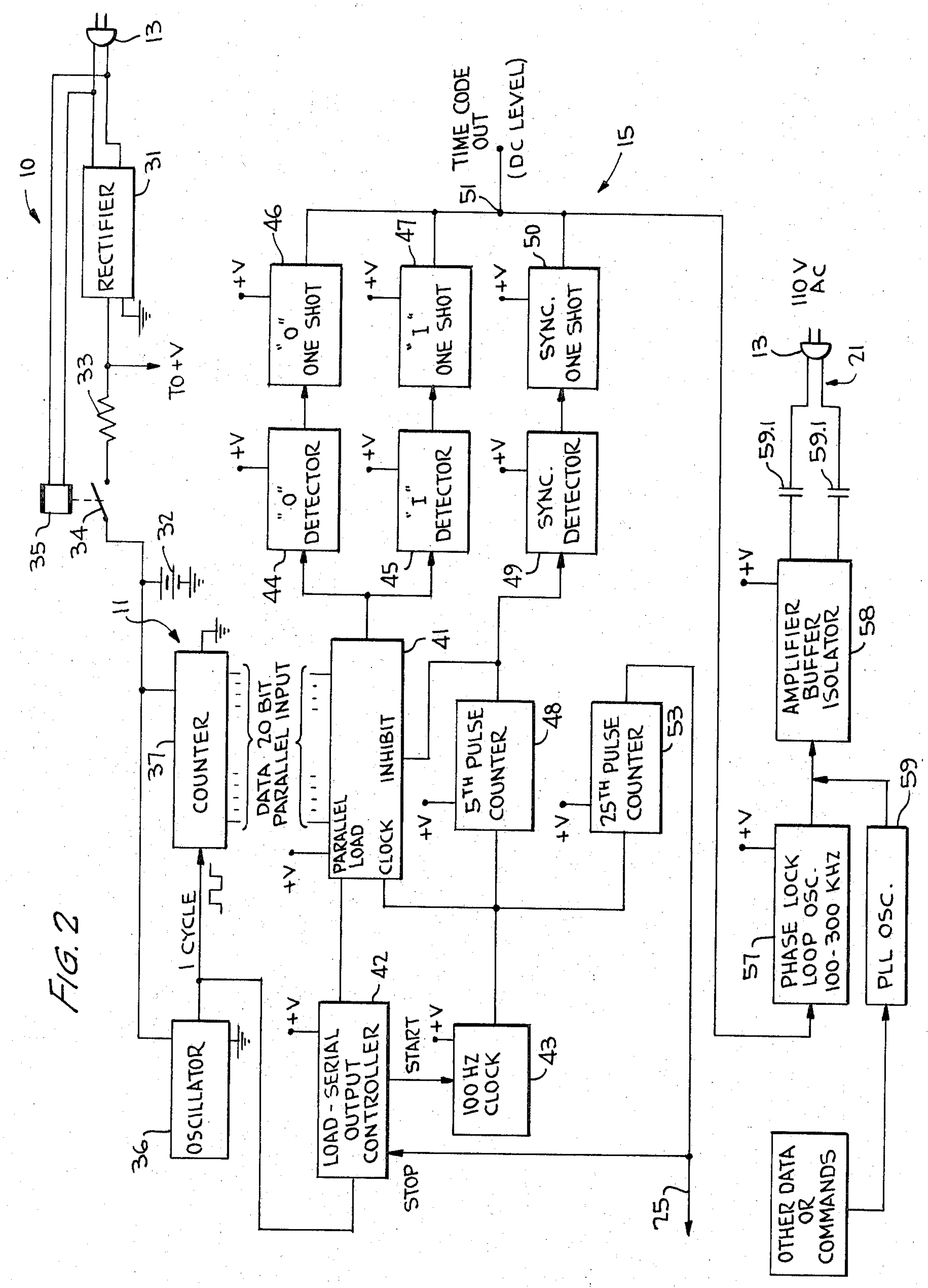
FIG. 2 is a block diagram of circuitry included at the central station of FIG. 1.

Reference is now made to FIG. 2 of the drawing wherein there is illustrated with greater particularity the apparatus included at the central station. A.C. power is supplied by plug 13 to rectifier 31 which derives a positive d.c. power supply voltage which normally charges battery 32 through dropping resistor 33 and contacts 34 of relay 35 that comprises the a.c. interrupt detector 17. Relay 35 includes a coil having terminals connected across the pair of leads of plug 13 so that in response to the a.c. voltage at plug 13 being above a predetermined level, contact 34 is closed. In response to a power failure, the a.c. voltage across the coil of relay 35 drops to zero, causing contact 34 to open, whereby battery 32 is decoupled from the rectifier and cannot be drained thereby.

The d.c. voltage across battery 32 is supplied to d.c. power supply input terminals of oscillator 36 and counter 37 which are included in master clock 11. Oscillator 36 and counter 37 are integrated circuit components, drawing a minimum of power from the supply between the terminals of battery 32, whereby the oscillator and counter remain in operation for a prolonged time in the event of a failure to the a.c. source connected to plug 13. Oscillator 36 includes a relatively precise, stable frequency source, such as a crystal or quartz oscillator, as well as a number of frequency division stages, whereby a square wave output is derived from the oscillator at a frequency of 1 cycle per second. The 1 cycle per second output of oscillator 36 drives the lowest stage of 20-stage counter 37, which derives a 20 binary bit, parallel output indicative of time in terms of seconds, minutes and hours, as indicated supra.

The 20 bit parallel output of counter 37 is converted into a 20 bit serial signal by time code transmitter 15. Each of the circuit elements of time code transmitter 15 includes a d.c. power supply input terminal (+V) which is responsive to the d.c. output voltage of rectifier 31. Thereby, in response to a power failure of the source connected to plug 13, the circuitry of time code transmitter 15 is deactivated to preclude transmission of the 20 bit, time indicating serial signal between the central and peripheral stations. Almost immediately upon restoration of power for the a.c. source connected to plug 13, the output voltage of rectifier 31 attains a sufficient value to enable the integrated circuits included in the various elements of transmitter 15 to be activated. Thereby, transmission between the central and peripheral stations is resumed almost immediately upon resumption of a.c. power to the source connected to plug 13. Upon resumption of power, the slave clocks at the peripheral stations are updated within a one-second interval to the correct time because of the once per second time indication transmission between the central and peripheral stations.

The crcuitry included in transmitter 15 for converting the 20 bit parallel output signal of counter 37 into a 20 bit serial signal comprises a 20 stage shift register 41, each stage of which is responsive to a different output bit of counter 37. The 20 stages of shift register 41 are simultaneously loaded in response to an output signal derived once per second by load-serial output controller 42. Controller 42 responds to the leading, positive going edge of the one-cycle output of oscillator 36. After controller 42 has responded to the output of oscillator 36 to enable shift register 41 to be loaded with the time indicating output signal of counter 37, the controller supplies a pulse to gated clock 43, enabling the clock to supply 100 Hertz clock pulses to a clock or shift input of shift register 41. In response to each clock pulse derived from clock 43, binary signals stored in the stages of register 41 are shifted.

The binary signal shifted out of the last stage of register 41 is supplied in parallel to zero and one detectors 44 and 45. In response to a binary zero signal being derived from the last stage of register 41, zero detector 44 derives a finite voltage level which is coupled to zero one-shot circuit 46. One-shot circuit 46 responds to the finite level to derive a pulse having a duration of 2.5±0.5 milliseconds. In response to a binary one being shifted out of the last stage of shift register 41, a finite, non-zero voltage is derived from one detector 45, causing one one-shot 47 to derive a pulse having a duration of 5±1 milliseconds.

After every fourth binary data pulse derived from one-shots 46 and 47, a synchronizing pulse is derived. To this end, a five-count counter 48 responds to the output of clock 43 so that in response to every fifth pulse derived from clock source 43 an output pulse is derived from counter 48. The output pulse of counter 48 is applied to an inhibit input terminal of shift register 41 to prevent shifting of the signal in the register in response to every fifth clock pulse supplied to the clock input of the shift register by clock 43. To derive synchronizing pulses, the output signal of counter 48 is also supplied to sync detector 49. Detector 49 responds to the output signal of counter 48 to derive a finite voltage that activates sync one-shot 50 to derive a pulse having a length of 8±1 milliseconds. The output pulses of one-shot circuits 46, 47 and 50, having lengths indicative of the binary value derived from the last stage of shift register 41 or the occurrence of a synch pulse, are applied to time code output terminal 51 until all twenty time indicating bits loaded in register 41 have been read out and a final sync pulse has been added.

Termination of readout of the contents of shift register 41 is controlled by 25 pulse counter 53, which is responsive to the output pulses of clock source 43. In response to counter 53 detecting 25 pulses from clock source 43, the counter derives a stop pulse which is applied to a stop input terminal of controller 42. Controller 42 responds to the stop pulse to prevent the further coupling of pulses from clock source 43 to shift register 41, as well as counters 48 and 53. Thereby, further operation of shift register 41, counter 48 and counter 53, as well as the circuits responsive thereto, is precluded until the next leading edge of the square wave voltage derived by one-cycle oscillator 36. The output pulse of counter 53 is supplied to line 25 to enable data and command source 16 to feed signals through transmitter 15 to a remote station in the interval between the output of counter 53 and the leading, positive going edge of the next pulse from oscillator 36.

For transmission via 60-cycle line 21 through plug 13 and television cable 22, the variable duration, 100 Hertz d.c. pulses derived at terminal 51 are converted into constant frequency bursts representing the value of the d.c. voltage at terminal 51. To this end, a d.c. connection is provided between terminal 51 and an input of voltage controlled oscillator 57 which drives power line 21 or cable 22 through amplifier-buffer-isolator circuit 58 which is connected to the power line via blocking capacitors 59.1. Voltage controlled oscillator 57, which preferably takes the form of a phase locked loop, responds to the d.c. level at terminal 51 to derive a first constant frequency whenever the voltage supplied thereto has a zero level and to derive a second frequency whenever the voltage supplied thereto has a finite, non-zero level. Exemplary frequencies derived by voltage controlled oscillator 57 are 140 KHz for a zero level and 160 KHz for a finite non-zero positive value. Signals from data and command source 16 are fed to a second phase locked loop voltage controlled oscillator 59 which feeds a pair of frequencies, different from the frequencies of oscillator 57, to amplifier-buffer-isolator 58, whereby at remote locations the time indications can be easily separated from signals of source 16.

Figure 3:
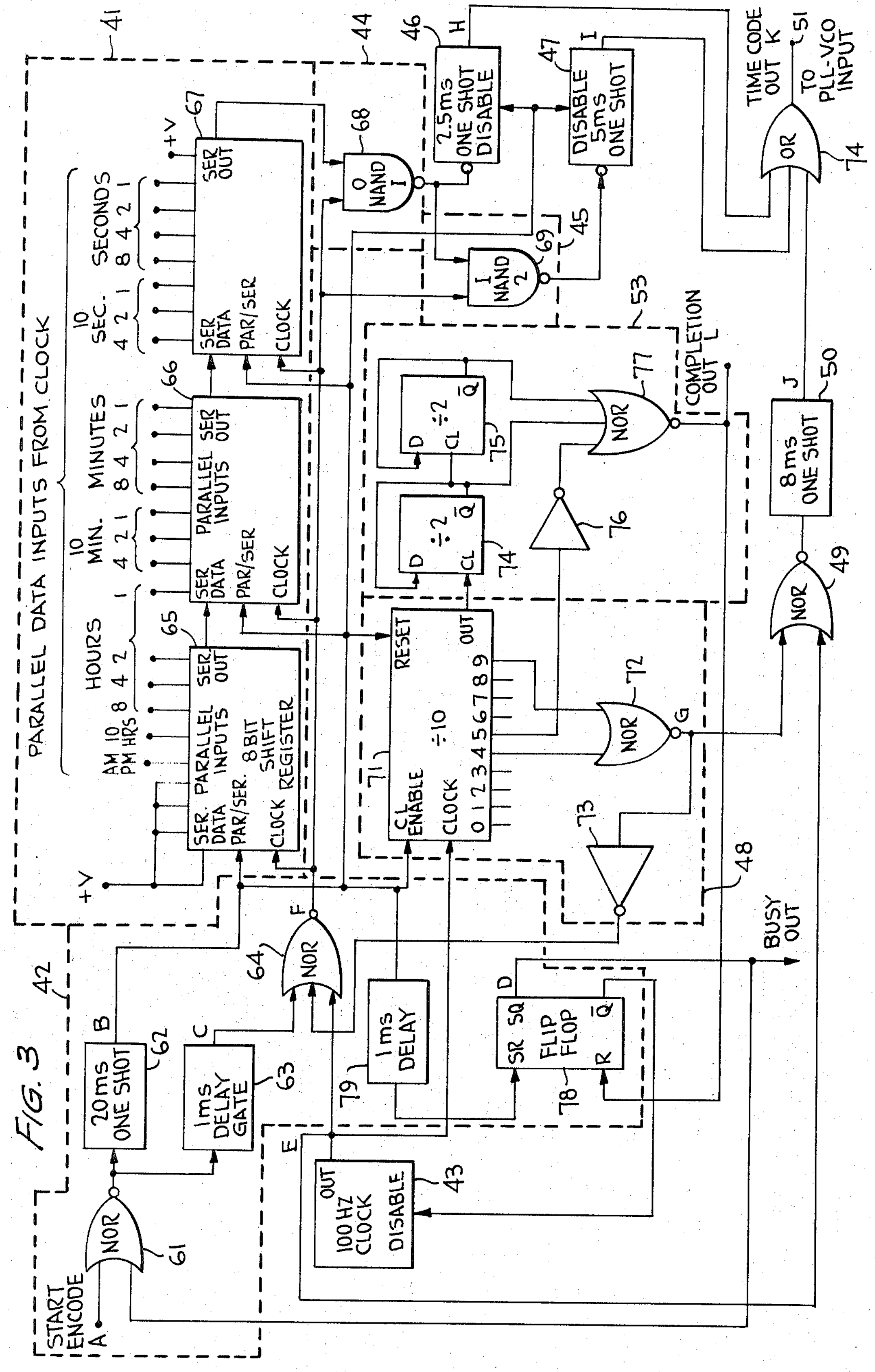
FIG. 3 is a circuit diagram of a time code transmitter portion of FIG. 2.
Figure 6:
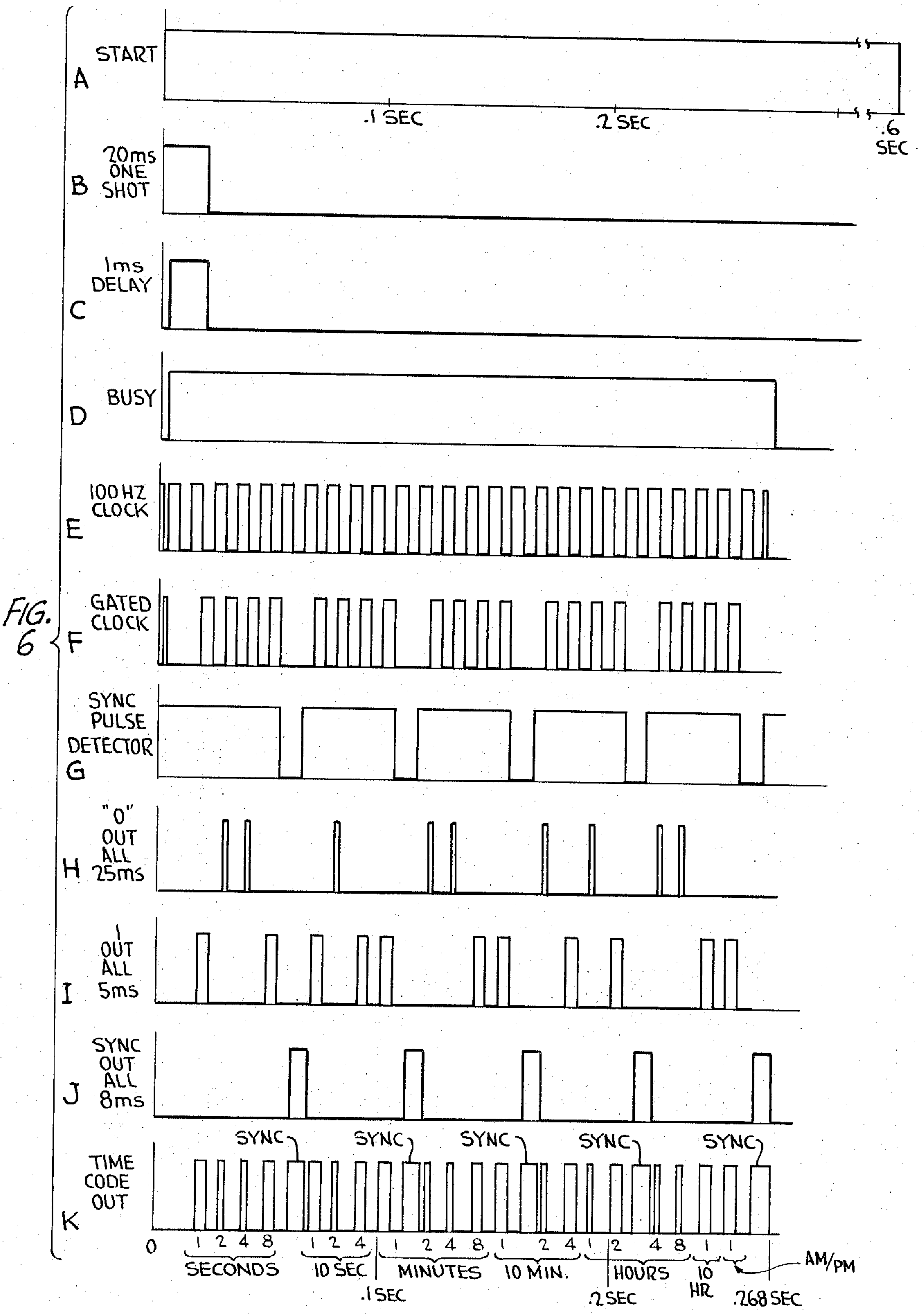
FIGS. 6A–6K are waveforms derived by the time code transmitter of FIG. 3.

Reference is now made to FIGS. 3 and 6 of the drawing wherein there are respectively illustrated the circuitry for converting the parallel, time indicating binary coded output bits of counter 37 into a serial signal with synchronization pulses and waveforms derived in the circuit. The waveforms A-K of FIG. 6 are correlated with voltages derived at various points in the circuit of FIG. 3 by providing corresponding lettered waveforms for the letters at certain terminal points or on certain lead lines of the FIG. 3 circuit.

Load-series output controller 42 includes a NOR gate 61 having one input responsive to the square wave output, waveform A, of oscillator 36. In response to the leading edge of the waveform A, NOR gate 61 feeds an activating input signal to 20 millisecond one-shot multivibrator 62, which derives a 20 millisecond output pulse, waveform B, having a leading edge at the beginning of every one-second period of oscillator 36. The output of NOR gate 61 is also applied to one milliseconds delay gate 63 which derives a 19 millisecond pulse, waveform C, having a leading edge that occurs 1 millisecond after the leading edge of waveform B and a trailing edge in time coincidence with the trailing edge of waveform B. Waveform C is applied as one input of NOR gate 64, which also responds to the 100-cycle square wave output, waveform E, of gated oscillator 43, and an indication of sync pulse derivation at terminal X to derive waveform F. Waveform F is basically an inverted replica of square wave E, except while pulse waveform B has a finite level and a sync pulse interval is occurring every fifth data pulse; at these times wavefom F has a zero value.

The B and F waveforms derived by one-shot multivibrator 62 and NOR gate 64 are applied to a pair of input terminals of shift register 41, which comprises three substantially identical eight bit shift registers 65, 66 and 67; registers 65–67 are preferably integrated circuit shaft registers, type DC 4014, manufactured by R.C.A. Each of shift registers 65–67 includes a serial data input terminal, a serial data output terminal, a clock or shift input terminal, eight parallel input terminals (one for each register stage), and a control input terminal for determining if the registers are to operate to be responsive to the parallel inputs supplied to the different stages therein or are to be operated in a shift or serial mode. The serial output terminals of stages 65 and 66 are respectively connected to the serial data input terminals of stages 66 and 67, while the serial data input terminal of register 65 and the first three stages of register 65 are connected to a positive d.c. supply voltage (+V). The remaining stages of register 65 and all of the stages of registers 66 and 67, except for the last stage of register 67, are responsive to the binary coded parallel output of master clock 11. The last stage of register 67 is connected to the positive supply terminal (+V) to provide proper delay for the first bit of each transmission. The clock input terminals of registers 65–67 are responsive to waveform F whle the control input terminals of the registers are responsive to waveform B. Thereby, for the first 20 milliseconds after the leading edge of waveform A, the time indication derived by master clock 11 is loaded into the appropriate stages of registers 65–67. After the 20 millisecond period has elapsed, each clock pulse of waveform F shifts the signals stored in registers 65–67, whereby a serial, binary signal is derived from the serial output of register 67 to provide the time indication in binary form.

The presence of a binary zero or one at the serial output terminal of register 67 is detected by NAND gates 68 and 69 (which comprise detectors 44 and 45) by connecting the serial output of register 67 to an input of NAND gate 68 and connecting the output of NAND gate 68 to the input of NAND gate 69. NAND gates 68 and 69 are driven in parallel by waveform F to provide clocking of the binary inputs to the gates. The outputs of NAND gates 68 and 69 are respectively fed to 2.5 millisecond and 5 millisecond one-shot multivibrators 46 and 47, which respectively derive the waveforms H and I for an exemplary situation wherein the time loaded into registers 65–67 is a.m. 12:59:59. To prevent the derivation of erroneous time indicating binary bits during the 20 millisecond period of the pulse of waveform B, waveform B is applied to disable inputs of one-shot multivibrators 46 and 47. The multivibrators respond to the disable input so that they are biased into a non-conducting state by the non-zero portion of waveform B and cannot be triggered into a conducting state to derive finite, non-zero output pulses.

To control the derivation of sync pulses, pulse counter 48 comprises an integrated circuit 10 stage, recirculating shift register 71, preferably R.C.A. type CD 4017, which includes 10 output terminals on each of which is derived a pulse having a frequency that is normally one-tenth the frequency of waveform E applied to the clock or shift input terminal of the register by clock 43. The pulses derived at the outputs of register 71 are phase displaced relative to each other. Register 71 also includes a clock enable input terminal and a reset terminal, both of which are responsive to waveform B. Waveform B, as applied to the enable input terminal of register 71, controls gating of pulses at the clock or shift intput terminal to the register so that during the first 20 milliseconds of a transmission period no shifting occurs in register 71. The leading edge of waveform B loads a binary one in the first or 0 stage of register 71 and loads a binary zero in the remaining stages of the register. After the initial 20 millisecond period has elapsed and during the remainder of the period while the serial time indication is being derived, each clock pulse output of clock 43 shifts, in a recirculating manner, the binary one initially loaded into stage 0 from one stage of register 71 to the next register stage and pulse is derived on the carry output terminal from the last stage, stage 9, after 10 shifts have occurred. Because of waveform B, during the initial 20 millisecond period after the leading edge of waveform A, clock pulses from source 43 applied to the clock input of register 71 have no effect on the circuit operation and the first stage of register 71 is loaded with a binary one value. To derive an output pulse in response to every fifth clock pulse derived by source 43, the 4 and 9 outputs of frequency divider 71 are connected to NOR gate 72, which derives waveform G that has negative going trailing edges in time coincidence with the leading edges of every fifth clock pulse, beginning with the sixth pulse of each transmission period, and trailing edges in time coincidence with the leading edge of every fifth clock pulse, beginning with the seventh clock pulse. Waveform G is applied through inverter 73 to an input terminal of NOR gate 64 to inhibit coupling through NOR gate 64 of the output of clock 43 while waveform G has a zero level.

Waveform G is also combined with the output of clock source 43 in NOR gate 49 (sync detector 49) which derives an output pulse to activate the 8 millisecond, sync one-shot multivibrator 50. One-shot multivibrator 50 derives sync waveform J, which is combined with the waveforms H and I in OR gate 74. Waveform J is a series of 8 millisecond pulses having leading edges in time coincidence with the leading edge of every fifth clock pulse, beginning with the seventh pulse of the transmission period. The output of OR gate 74, at terminal 51, is waveform K that is a composite, twenty-five bit serial signal representative of a.m. 12:59:59 and includes five sync pulses, one between every fourth data pulse.

Twenty-five pulse counter 53 includes a pair of cascaded divide by two frequency dividers 74 and 75, having reset ($\bar{Q}$) outputs which are latched by providing a d.c. connection between the $\bar{Q}$ outputs and a toggle input (D) of each divider. Frequency dividers 74 and 75 also include clock inputs ($C_L$), which are respectively responsive to a carry output of counter 71 and the $\bar{Q}$ output of frequency divider 74. The 5 output of register 71, as coupled through inverter 76, is combined with the $\bar{Q}$ outputs of frequency dividers 74 and 75 in NOR gate 77, the output of which is waveform having a leading edge that occurs simultaneously with the leading edge of the 26th clock pulse of the transmission interval. The leading edge of the output of NOR gate 77 is applied to lead 25 to enable source 16, as well as to a reset input of flip-flop 78. Flip-flop 78 has a set input responsive to a one millisecond delayed replica of waveform B, which is coupled to the flip-flop via delay element 79. Flip-flop 78 includes true and complementary output terminals (Q and $\bar{Q}$) which are connected to a disable input of clock source 43 and to an input of NOR gate 61. The set and reset inputs (S and R) of flip-flop 78 respond solely to the positive going, leading edges of the voltages applied thereto, whereby waveform D, at the Q output of the flip-flop, has a leading edge in substantial time coincidence with the leading edge of waveform C, 1 millisecond after the leading edge of waveform A, and a trailing edge in time coinicidence with the leading edge of the output of NOR gate 77. While waveform D is being derived, NOR gate 61 is deactivated and cannot pass positive going noise voltages which may be applied to the other input of the NOR gate while waveform D has a finite, non-zero value.

Figure 4:
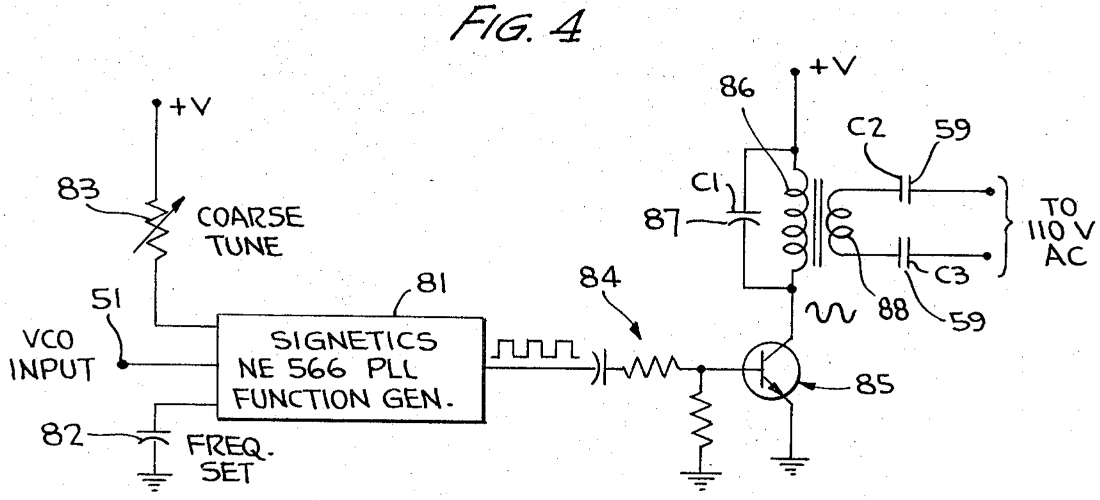
FIG. 4 is a circuit diagram of a transmitter portion of FIG. 2.

Reference is now made to FIG. 4 of the drawing wherein there is illustrated circuit diagram of voltage control oscillator 57 and amplifier-buffer-oscillator 58. The voltage controlled oscillator 57 comprises a phase locked loop oscillator, preferably of the integrated circuit type as supplied by Signetics, type NE 566. Phase locked loop 81 includes three input terminals, two of which are utilized for controlling the frequency of oscillations derived thereby in a coarse manner, on a predetermined basis, and a third input terminal which is responsive to the d.c. voltage at terminal 51. The frequency of the voltage controlled oscillator is coarsely set by properly selecting the values of capacitor 82 and resistor 83 which are respectively connected between a first input terminal of the phase locked loop 81 and ground and between a second input terminal and a positive, d.c. power supply input terminal (+V). The frequency of oscillation of phase locked loop 81 is nominally set by the coarse adjustment to 100 KHz. In response to a zero voltage at terminal 51, the frequency derived by phase locked loop 81 is 140 KHz; in response to a finite voltage at terminal 15, the phase locked loop derives a frequency of 160 KHz. Suitable voltage control circuitry is included in the phase locked loop 81 so that it is responsive solely to one of two values of the voltage at terminal 15, whereby the voltage controlled oscillator output frequency is solely one of two values.

Phase locked loop 81 derives a square wave output that is applied through an a.c. coupling and bias network 84 to the base of NPN transistor 85 that is included in amplifier-buffer-isolator circuit 58. Transistor 85 has a tuned collector circuit comprising transformer primary winding 86 which is shunted by capacitor 87. Secondary winding 88 of the transformer supplies seven volt peak-to-peak a.c. signals at 140 KHz or 160 KHz to a two-wire transmission line, such as a.c. power line 21, via a.c. coupling capacitor 59.1.

Figure 5:
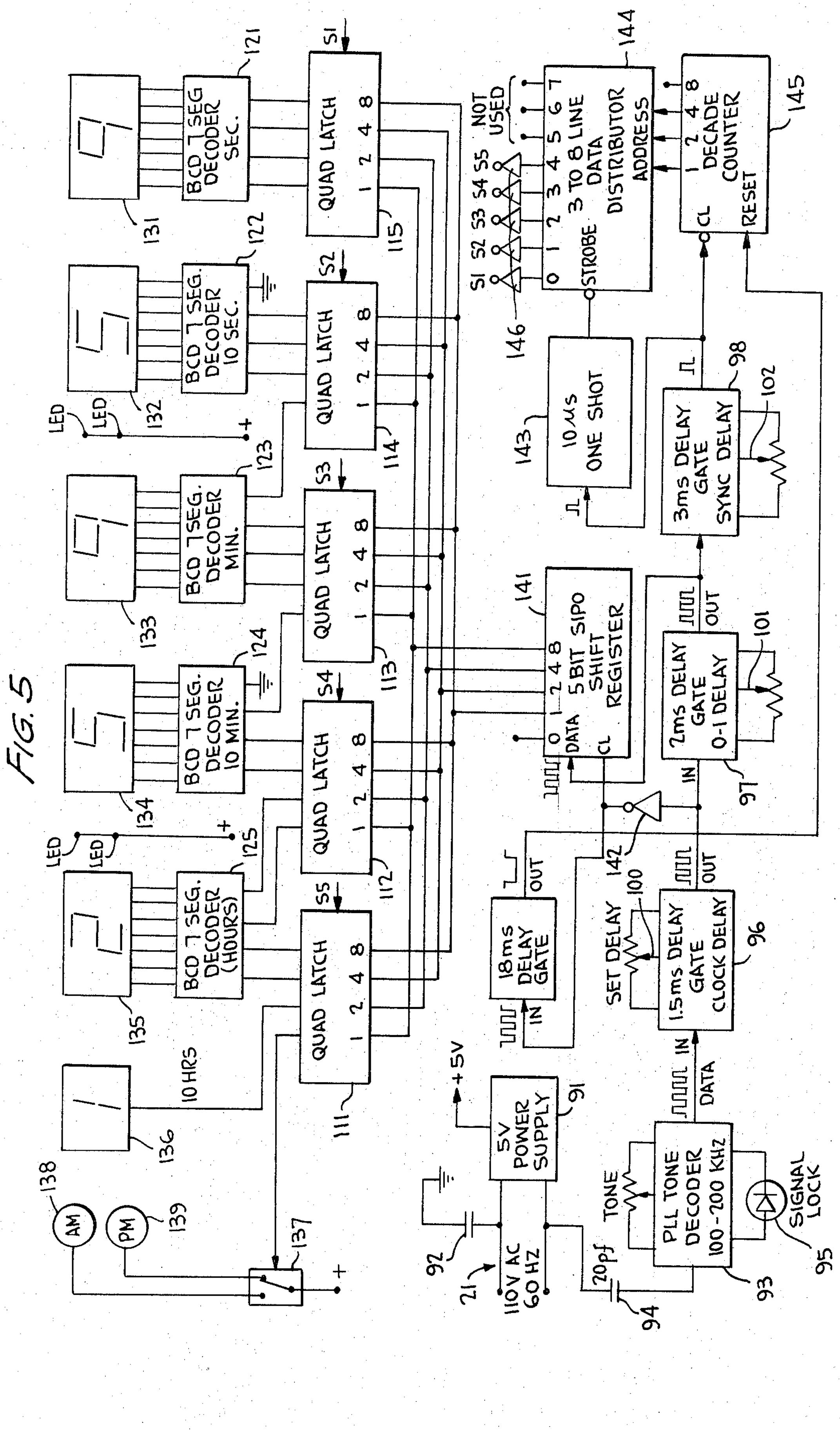
FIG. 5 is a circuit diagram of equipment included at a peripheral station including a slave clock.

The circuitry at an exemplary peripheral station for detecting, decoding and displaying the time indications transmitted via a.c. power line 21 is illustrated in FIG. 5. The a.c. power line is connected to a rectifier which derives a d.c. voltage for energizing the remaining active circuit elements of the peripheral station. One side of line 21 is connected to ground through isolating capacitor 92, while the other side of line 21 is connected to phase locked loop tone decoder 93 through a.c. coupling capacitor 94. In the event that a telephone line or a television cable is employed for transmitting time indications between the stations, rectifier 91 is connected directly to the 60-cycle a.c. power source and the lines of the television cable 22 or phone link 23 are connected to ground and phase locked loop tone decoder 93 through suitable coupling capacitors.

Phase locked loop tone decoder 93 is adjusted so that it locks onto the 140 KHz frequency associated with a zero voltage indication at the transmitter. In response to a binary coded signal being on line 21, as indicated, e.g., by transmission of the frequency 160 KHz or a frequency derived from phase locked loop oscillator 59, or in response to no coded data being transmitted via line 21, decoder 93 is not locked. Decoder 93 responds to the 140 KHz signal at its input to derive a finite output voltage only while a zero voltage level is derived at terminal 51 of the central station and the central station phase locked loop voltage controlled oscillator 57 is energized. To indicate transmission of a signal on line 21, a low pass filter circuit (not shown) is connected to be responsive to the output of tone decoder 93 and drive light emitting diode 95. Thereby, a positive, digital output is derived from light emitting diode 95 to indicate that time indicating signals are being transmitted between the central and peripheral stations.

To enable the variable duration pulses derived from tone decoder 93 to be detected, the output of the tone detector is applied to cascaded delay gates 96, 97 and 98. Delay gates 96–98 include manually controllable delay setting potentiometers 100–102 which control the delay gates so that the leading edges of outputs thereof are respectively delayed relative to the leading edges of inputs thereof by 1.5 milliseconds, 2 milliseconds, and 3 milliseconds. The trailing edge of each of the delay gates is in time coincidence with the trailing edge of its input. Thereby, the 2.5 millisecond binary zero data indications are derived from delay gate 96 as 1.0 millisecond pulses and have no effect on the outputs of delay gates 97 and 98. The 5 millisecond binary one data indications are derived from delay gate 96 as 3.5 millisecond pulses, from delay gate 97 as 1 millisecond pulses, and have no effect on the output of delay gate 98. The 8 millisecond sync pulses are respectively derived from gates 96, 97 and 98 as pulses having durations of 6.5 milliseconds, 4.5 milliseconds, and 1.5 milliseconds. Since each of delay gates 96–98 prevents pulses having a duration less than the delay time thereof from being derived at its output, short duration noise pulses which might be transmitted between the central and peripheral stations have no effect on the outputs of the delay gates and the system is thereby relatively noise immune.

To convert the output signals of delay gates 96–98 into a time indication, five quad latch circuits (four-element integrated circuit scratch pad memories) 111–115 are provided, whereby one memory element is provided for each binary bit of the time indication to be displayed. If it is desired to display seconds only in terms of tens of seconds, rather than in terms of units of seconds, quad latch circuit 111 can be eliminated, and quad latch circuit 112 can be replaced with a single memory element if it is desired to display only hours and minutes. Each quad latch circuit includes an enable input and four flip-flops, each of which is connected to a separate input terminal and a separate output terminal which derives a binary signal voltage commensurate with the binary signal applied to its input terminals. Quad latch circuits 111–115 are energized in sequence by sequentially applying enabling voltages to their input enable terminals $S_1$–$S_5$. In response to an enabling voltage being applied to one of quad latch circuits 111–115, the flip-flop elements in the enable quad latch circuit are driven to a binary level commensurate with the binary level on its input signal terminal. The flip-flop circuits of a particular quad latch remain at the state of their input terminals after the enable and the signal input voltages have subsided until the next enable voltage for that quad latch is derived, at which time the flip-flops in the quad latch are susceptible to change of state.

The output terminals of squad latch circuits 111–115 are connected to binary coded decimal to decimal decoders 121–125 which drive electronic numerical indicators 131–135 that can be of any conventional form, such as a Nixie tube, liquid crystals or light emitting diodes. The four output terminals of quad latch circuit 111 are connected to the four input terminals of decoder 121 which drives indicator 131 for units of seconds. The three least significant bit outputs of quad latch circuit 112 are connected to the three least significant bit inputs of decoder 122, which drives indicator 132 for tens of seconds. The most significant bit output of squad latch unit 112 and the three least significant bit outputs of quad latch unit 113 are supplied to four input terminals of decoder 123, the output of which drives indicator 133 for unit values of minutes. The most significant bit output of quad latch circuit 113 and the two least significant bit outputs of quad latch unit 114 are applied as the three least significant bit inputs of decoder 124, the output of which drives indicator 134 for tens of minutes. The two most significant bit output terminals of quad latch circuit 114 and the two least significant bit outputs of quad latch circuit 115 are applied to the four input terminals of decoder 125, the output of which drives indicator 135, which is employed to indicate the unit value of hours. The next to most significant bit output of quad latch circuit 115 is applied directly to decimal indicator 136 which indicates tens of hours. The most significant bit output of quad latch circuit 115 is connected to control double pole single throw electronic switch 137 which alternately supplies d.c. voltage to light emitting diodes 138 and 139, which respectively are illuminated for the a.m. and p.m. indications derived from master clock 11.

To provide the time display in conventional terms, the ten digits of minutes and the unit digits of hours are separated by a pair of light emitting diodes, which are arranged topologically to form a colon and which are constantly energized by a positive d.c. source (+V). Similarly, if a second indication is provided, the tens indication for seconds and the units indication for minutes are separated by a colon formed by a pair of light emitting diodes that are constantly energized by a d.c. source.

The circuitry for controlling energization of quad latch circuits 111–115 comprises five-bit non-recirculating shift register 141, which is preferably an integrated circuit available from R.C.A., type 7496. Register 141 includes a shift input terminal responsive to an inverted replica of the output of delay gate 96, as coupled through inverting amplifier 142 and a load input terminal responsive to the output of delay gate 97 which indicates the presence of a binary one and sync pulse input signal to the peripheral station. Positive going edges of pulses derived by delay gate 97, which occur only in response to transmission of binary one and sync signals from the central to the peripheral station, are thereby loaded as binary ones into shift register 141 from the output of delay gate 97; a binary zero signal is not loaded into the shift register because the output of delay gate 97 does not have a positive going edge in response thereto. Since the shift input terminal of register 141 responds to the positive going, leading edge of pulses derived from inverter 141 and to prevent pulse race conditions in the register, a slight delay, e.g., 10 microseconds, is imposed on the trailing edge of the output of delay gate 96 prior to being fed to the data input of the register. In response to every binary zero, binary one or synchronizing pulse transmitted from the central station to the peripheral station, the signal stored in register 141 is shifted from one stage to the next stage. Thereby, upon the completion of the first four signal bits and the synchronizing pulse, shift register 141 stores in its stage 0 a binary one (for the sync pulse) and in its stages 1, 2, 4, 8 binary levels commensurate with the units value of seconds. In response to the sync pulse, the four signal indicating bits in stages 1, 2, 4, 8 of register 141 are fed to the four input terminals of quad latch circuit 111.

To control into which of the four quad latch circuits 111–115 the four binary indicating bits of shift register 141 are read, there are provided one-shot multivibrator 143, three to eight line data distributor 144, and decade counter 145.

Three to eight line data distributor 144, preferably an integrated circuit manufactured by R.C.A., type 74155, effectively decodes a binary signal on three of its address input leads (1, 3, 4) into one of five decimal values. The decimal value is indicated by activation of a selected one of five outputs (0–4) of the data distributor. Signals at the output terminals 0–4 of data distributor 144 are respectively fed as enable inputs, through inverters 146 to quad latch circuits 111–115.

The binary value fed to the three address inputs of distributor 144 is derived from decade counter 145, having a clock or shift input responsive, with a slight delay (on the order of 25 microseconds), to the trailing edge of the output of delay gate 98, which is derived only in response to a sync pulse being detected by tone code detector 93. Prior to decade counter 145 being supplied wtih the first sync pulse indication by the output of delay gate 98, the decade counter is reset to zero in response to the output of 18 millisecond delay gate 147, which in turn is responsive to the output of inverter 142. Delay gate 147 derives a pulse output only in response to the 20 millisecond pulse derived by decoder 93 at the beginning of transmission of a particular time indication, to provide resetting of decade counter at that time. Thereby, while the binary value indicative of the units value of seconds in the time indication is being derived, the output of decade counter 145 is a zero value. In response to the first sync pulse of a time indication being derived, decade counter 145 is advanced by the output of delay gate 98 so that the decade counter stores a value of one, which value subsists in the decade counter while the binary indication of tens of seconds is being detected. The decade counter, in a similar manner, thereby stores an indication of the number of sync pulses transmitted during each particular time indication transmission interval.

The value stored in decade counter 145 is decoded to a decimal value by distributor 144, which is activated by a short duration, 10 microsecond, pulse at the beginning of each synchronizing pulse. To this end, the output of 10 microsecond one-shot multivibrator 143 is applied to a strobe input of data distributor 144, whereby the binary value in decade counter 145 prior to the leading edge of the synchronizing pulse is decoded to energize one of the decimal output lines of data distributor 144.

To consider a specific example, assume that the time indication is a.m. 12:59:59, as indicated by waveform K, and that decade counter 145 has been reset to zero. The value of nine for the units indication of seconds is read into shift register 141 by applying binary one values to the data input terminal of shift register 141 by delay gate 97 while the first and fourth shift pulses are being applied to the shift register by delay gate 96. Thereby, when the first synchronizing pulse is fed to decoder 93, shift register 141 feeds binary one signals to its 1 and 8 output terminals, while feeding binary zero values to its 2 and 4 output terminals. The leading edge of the first synchronizing pulse results in data distributor 144 being strobed, whereby a binary one output is derived from its 0 output terminal, which results in energization of the enable input of quad latch circuit 111. Thereby quad latch circuit 111 is responsive to the binary values 1001 at the four output terminals of shift register 141, but the remaining quad latch circuits are unresponsive to the output of shift register 141. After distributor 144 has responded to the pulse at its strobe input terminals and the distributor has been returned to a quiescent condition, decade counter 145 is stepped to a count of one by the trailing edge of the output of delay gate 98. Quad latch circuit 111 stores the binary coded value on nine fed thereto by shift register 141 until the next transmission of time coded information, one second later.

After the next four data bits have been decoded, shift register 141 has binary one values at its 1, 4, and 8 output terminals, while the remaining output terminal of the shift register is loaded to a binary zero value. In response to the leading edge of the second sync pulse, data distributor 144 responds to the binary value of one stored in decade counter 145 to enable quad latch circuit 112 to be responsive to the binary signals 1011 now derived at the output terminals of shift register 141. The binary values 101 now derived from terminals 1, 2 and 4 of quad latch circuit 112 cause indicator 132 to generate the numerical symbol five, while the binary one value derived from terminal 8 of quad latch circuit 112 assists in controlling the numerical symbol derived from the units indicator for minutes. Operation continues in the stated manner until the last sync pulse of the time code transmission is received, at which time each of the quad latch circuits 111–115 is loaded with an appropriate value for the time code and these values are continuously fed through binary coded decimal-to-decimal decoders 121–125 to decimal indicators 131–135 until the first sync pulse of the next transmission is detected.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A system for transmitting timing information from a central station to a slave clock at a peripheral station via a two-wire line between the stations, wherein the timing indication at the peripheral station is automatically restored upon the resumption of power after a power failure has occurred at the central station, comprising: at the central station: a master clock, circuitry means responsive to the master clock for periodically deriving a coded signal indicative of the time of day in terms of at least hours and minutes, means responsive to the coded signal for supplying the coded signal to the two-wire line as a serial signal, an a.c. power supply terminal, means responsive to the a.c. power at the a.c. power supply terminal for supplying energizing power to each of (a) the clock circuitry, (b) the coded signal deriving means (c) the means for supplying the coded signal to the line, a battery power supply means, means responsive to a failure of the a.c. power supply for substituting the battery power supply for the a.c. power supply for the clock circuitry and for disabling transmission of the coded signal via the two-wire line; at the remote station: decoding means for periodically converting the time indicating serial signal transmitted via the two-wire line into an indication of time of day in terms of at least hours and minutes, and means for activating the slave clock in response to the converted signal.

2. The system of claim 1 wherein each time indication has a duration less than the period between adjacent time transmissions, and further including: another coded signal source, and means for enabling signals from said another source to be transmitted on said line only in the interval between the end of a first time code indication and the beginning of the next time code indication.

3. The system of claim 1 wherein the means for periodically deriving includes means for deriving a pulse duration modulated signal indicative of binary coded values for the time of day, said modulated signal having first and second voltage levels, said means for supplying includes means for respectively deriving first and second frequencies in response to the first and second voltage levels.

4. The system of claim 1 wherein the means for periodically deriving includes means for deriving a pulse duration modulated signal indicative of binary coded values for the time of day, said modulated signal having first and second voltage levels, means for periodically inserting a sync pulse having one of said levels between adjacent code indicating pulses, said sync pulse having a duration different from the durations of the pulses indicative of binary coded values.

5. The system of claim 4 wherein the coded signal for each time indication includes the same predetermined number of binary bits representing the coded time signal and the sync pulse, and the decoding means includes a shift register, means for loading said register with first binary values of the signal to the exclusion of second binary values of the signal, means for shifting the signal loaded in the register in response to every binary bit and sync pulse of the signal, and means for reading out data indicating bits, to the exclusion of the sync bits, from the register to the slave clock.

6. The system of claim 5 wherein the shift register has a number of stages equal to the number of data indicating bits between adjacent sync pulses plus one, a binary storage circuit for each value indicating bit of the signal, means for simultaneously transferring binary data indicating bits stored in the register to several of said storage circuits while decoupling the remainder of the storage circuits from the bits stored in the register, said means for transferring being sequentially activated so that each of the storage circuits is responsive to a bit stored in the register during each time indicating signal.

7. The system of claim 4 wherein said means for supplying includes means for respectively deriving first and second frequencies in response to the first and second voltage levels, and the peripheral station includes means for converting said frequencies into a serial signal having a pair of voltage levels.

8. The system of claim 1 wherein the coded signal for each time indication includes the same predetermined number of binary bits, and the decoding means includes a shift register having a number of stages less than the number of bits in the signal, means for loading said register with first binary values of the signal to the exclusion of second binary values of the signal, means for shifting the signal loaded in the register in response to every binary bit of the signal, a binary storage circuit for each value indicating bit of the signal, and means for simultaneously transferring binary bits stored in the register to several of said storage circuits while decoupling the reaminder of the storage circuits from the bits stored in the register, said means for transferring being sequentially activated so that each of the storage circuits is responsive to a bit stored in the register during each time indicating signal.

9. A system for transmitting timing information from a master clock at a central station to a slave clock at a peripheral station via a two-wire line between the stations, said line carrying signals other than the time information or power between the stations, comprising: at the central station: circuitry means responsive to the master clock for periodically deriving a binary coded serial signal indicative of time of day in terms of at least hours and minutes, means responsive to the serial signal for deriving a pulse duration modulated signal indicative of binary coded values for the time of day, said modulated signal having first and second voltage levels, means for respectively deriving first and second frequencies in response to the first and second voltage levels, and means for applying said frequencies to the line; said peripheral station including: means for converting the first and second frequencies into a pair of voltage levels to derive a received pulse duration modulated serial data signal, and means for driving the slave clock in response to the received serial data signal.

10. The system of claim 9 wherein each time indication has a duration less than the period between adjacent time transmissions, and further including a coded signal source, and means for enabling signals from said coded signal source to be transmitted as a further frequency on said line only in the interval between the end of a first time code indication and the beginning of the next time code indication.

11. The system of claim 9 further including means for periodically inserting a sync pulse having one of said levels between adjacent code indicating pulses, said sync pulse having a duration different from the durations of the pulses indicative of binary coded values.

12. The system of claim 11 wherein the coded signal for each time indication includes the same predetermined number of binary bits representing the coded time signal and the sync pulse, and the decoding means includes a shift register, means for loading said register with first binary values of the signal to the exclusion of second binary values of the signal, means for shifting the signal loaded in the register in response to every binary bit and sync pulse of the signal, and means for reading out data indicating bits, to the exclusion of the sync bits, from the register to the slave clock.

13. The system of claim 12 wherein the shift register has a number of stages equal to the number of data indicating bits between adjacent sync pulses plus one, a binary storage circuit for each value indicating bit of the signal, means for simultaneously transferring binary data indicating bits stored in the register to several of said storage circuits while decoupling the remainder of the storage circuits from the bits stored in the register, said means for transferring being sequentially activated so that each of the storage circuits is responsive to a bit stored in the register during each time indicating signal.

14. The system of claim 9 wherein the coded signal for each time indication includes the same predetermined number of binary bits, and the decoding means includes a shift register having a number of stages less than the number of bits in the signal, means for loading said register with first binary values of the signal to the exclusion of second binary values of the signal, means for shifting the signal loaded in the register in response to every binary bit of the signal, a binary storage circuit for each value indicating bit of the signal, and means for simultaneously transferring binary bits stored in the register to several of said storage circuits while decoupling the remainder of the storage circuits from the bits stored in the register, said means for transferring being sequentially activated so that each of the storage circuits is responsive to a bit stored in the register during each time indicating signal.

15. A central station for transmitting timing information from a master clock to a slave clock at a peripheral station via a two-wire line between the stations, wherein the timing indication at the peripheral station is automatically restored upon the resumption of power after a power failure has occurred, comprising: circuitry means responsive to the master clock for periodically deriving a coded signal indicative of the time of day in terms of at least hours and minutes, means responsive to the coded signal for supplying the coded signal to the two-wire line as a serial signal, an a.c. power supply terminal, means responsive to the a.c. power supply terminal for supplying energizing power to each of (a) the clock circuitry, (b) the coded signal deriving means and (c) the supplying means, a battery power supply means, means responsive to a failure of the a.c. power supply for substituting the battery power supply for the a.c. power supply for the clock circuitry and for disabling transmission of the coded signal via the two-wire line.

16. A peripheral receiving station for displaying time information transmitted from a central station as a serial binary bit data signal indicative of time of day in terms of at least hours and minutes, said signal including sync pulses periodically inserted between adjacent data pulses, binary values of said data bits being represented as pulses having first and second durations, said sync pulses being represented as pulses having a third duration, the same number of data and sync pulses being included in each time of day indication, comprising a slave clock, a shift register, means for loading said register with first binary values of the signal to the exclusion of second binary values of the signal, means for shifting the signal loaded in the register in response to every binary bit and sync pulse of the signal, and means for reading out data indicating bits, to the exclusion of the sync bits, from the register to the slave clock.

17. The station of claim 16 wherein the shift register has a number of stages equal to the number of data indicating bits between adjacent sync pulses plus one, a binary storage circuit for each value indicating bit of the signal, means for simultaneously transferring binary data indicating bits stored in the register to several of said storage circuits while decoupling the remainder of the storage circuits from the bits stored in the register, said means for transferring being sequentially activated so that each of the storage circuits is responsive to a bit stored in the register during each time indicating signal.

18. The station of claim 16 wherein said signal includes first and second frequencies respectively representing the absence and presence of a pulse, and further including means for detecting said frequencies to derive first and second voltage levels respectively responsive to the first and second frequencies and indicative of the binary values.

19. The station of claim 18 wherein the shift register has a number of stages equal to the number of data indicating bits between adjacent sync pulses plus one, a binary storage circuit for each value indicating bit of the signal, means for simultaneously transferring binary data indicating bits stored in the register to several of said storage circuits while decoupling the remainder of the storage circuits from the bits stored in the register, said means for transferring being sequentially activated so that each of the storage circuits is responsive to a bit stored in the register during each time indicating signal.

* * * * *